June 12, 1951     G. PAVKOV     2,556,553
TRACTOR TIRE VALVE PROTECTOR
Filed Feb. 18, 1948
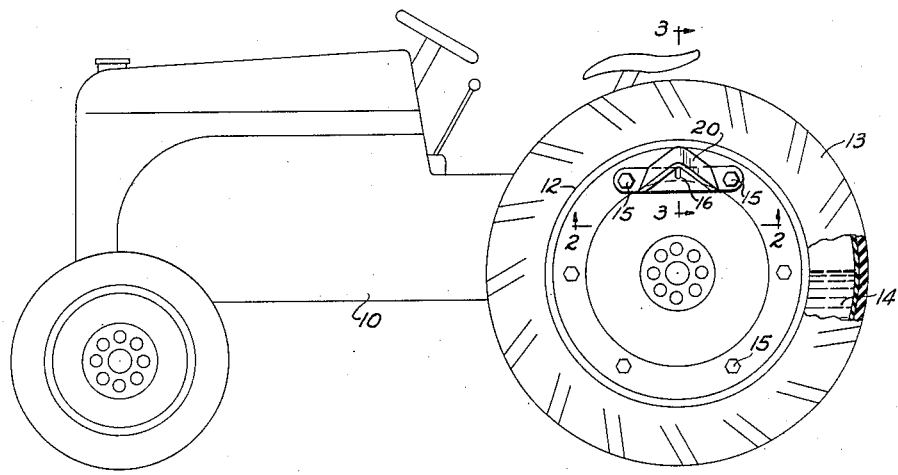
Fig. 1
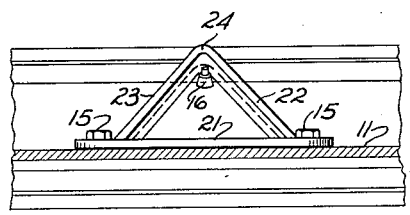     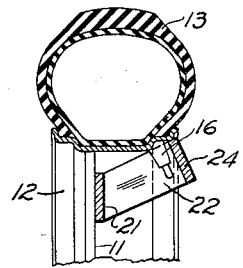
Fig. 2     Fig. 3
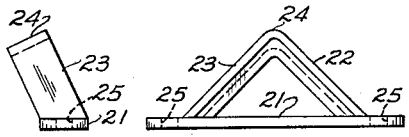     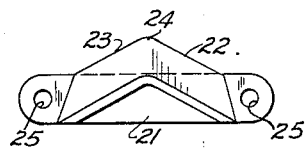
Fig. 4    Fig. 5    Fig. 6
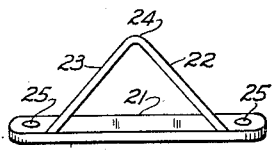
Fig. 7
INVENTOR.
GEORGE PAVKOV
BY
*Morton S. Brockman*

Patented June 12, 1951

2,556,553

UNITED STATES PATENT OFFICE 2,556,553

TRACTOR TIRE VALVE PROTECTOR

George Pavkov, Doylestown, Ohio, assignor to Lester Brazelton, Cuyahoga Falls, Ohio Application February 18, 1948, Serial No. 9,063

3 Claims. (Cl. 301—5)

This invention relates to tire valve protectors and particularly to a valve protector for use with tractor tire valves.

Conducive to a better understanding of this invention, it may be well to point out that tractor wheels employ what is known in the art as full drop center rims as a tire retaining base. This type of rim is used because it permits of easy mounting and removal of the tire. However, with this type of rim, a straight valve stem must be used and the stem must be positioned toward the side of the inner tube. When mounted on the wheel, the valve stem protrudes out at an angle and its tip is almost in line with the outside wall of the tire casing. The exposed position of the valve stem subjects it to blows from foreign objects that may bend or break it. This is especially true when the tractor wheel is mounted with the valve stem toward the frame of the tractor, as is sometimes necessary in order to satisfactorily space the wheels to meet the requirements of certain field crops. Stones and brush picked up by the tire tread may become wedged between the tractor frame and the tire, causing the valve stem to bend each time it passes the obstruction. Repeated flexing of the valve stem will eventually crack it or break it off entirely. As a result, the tractor will not only be disabled but valuable loading fluid, such as calcium chloride solution, which is sometimes carried in the inner tube, will be lost.

The primary object of this invention therefore is to provide a valve stem protector for use with full drop center rim wheels that will fend off all foreign bodies from contact with the valve stem.

Another object is to provide a device of the type stated that is simple in its construction, strong and durable, inexpensive to manufacture, thoroughly efficient and reliable in use, and otherwise well adapted to the purpose for which it is designed.

These and other objects will become apparent from a reading of the following specification and claims, together with the accompanying drawing which like parts are referred to and indicated by like reference characters and wherein:

Figure 1 is a side elevation of a conventional tractor, showing the tire valve stem protector, which is the subject of this invention, mounted on the rear wheel thereof;

Figure 2 is a bottom view of the mounted valve stem protector looking in the direction of the arrows 2—2 of the Figure 1;

Figure 3 is a vertical sectional view taken substantially along the line and in the direction of the arrows 3—3 of the Figure 1;

Figure 4 is an end view of the unmounted valve stem protector with its base member horizontal;

Figure 5 is a front view of the same;

Figure 6 is a top view of the same; and

Figure 7 is another front view of the unmounted valve stem protector, showing it with its base member tilted forward.

The Figure 1 of the drawing shows a conventional farm tractor 10 having the usual 10.00 x 28-4 ply pneumatic tire 13 mounted on its rear wheel 11. Reference character 14 indicates a solution of calcium chloride in water, with which tractor tires are often filled in order to add weight to the vehicle. A valve stem protector 20, made in accordance with this invention, is shown mounted on the rim retaining lugs 15 at the valve stem 16.

In its preferred form, the protector is fabricated from 3/8" x 1 1/2" flat steel stock, although any other suitable size stock and type of material may be used if desired.

The protector has an elongated base member 21 which has bolt holes 25 at both ends thereof. The holes are spaced to fit over two adjacent rim lugs or bolts 15 of the particular wheel rim with which the protector is to be used. A V-shaped guard, fabricated from a pair of bars 22 and 23 joined at their outer ends 24, is welded to the top surface 26 of the base member 21, as shown most clearly in the Figures 4, 5, 6 and 7.

The length of the guard bars 22 and 23 is such that their meeting point 24 will be on the outside of the valve stem 16, so that the two bars form a rigid shield of steel around the valve stem 16, as shown in the Figures 1, 2 and 3.

Referring to the Figure 3, it will be seen that the valve stem 16 projects below the rim 12 in an outwardly direction, while the base member 21 of the protector 20 is mounted flat against the wheel 11 in a vertical plane. Therefore, the bars 22 and 23 of the V-shaped guard member are joined to the top surface 26 of the base 21 at an acute angle with a plane drawn perpendicular to the top surface 26 and passing thru the two base ends of the bars 22 and 23. The exact angle chosen should be such that the inner surface of the apex 24 of the guard lies parallel with the plane of the valve stem, as is most clearly indicated in the Figure 3. In other words, the guard bars 22 and 23 extend outward from the base in an upward direction when the base is mounted on the wheel rim, as indicated in the Figures 1 and 3.

While the parts have been described as being welded together, it is to be understood that they could be joined in any other suitable way. Instead of fabricating the V-shaped guard member from two separate bars 22 and 23, it could also be made from one long bar bent back upon itself.

The shape of the protector and the angular disposition of the parts causes debris encountered by the protector to move outward and away from the wheel 11 and past the valve stem 16.

While the protector 20, in the Figure 1, is shown mounted on the outside of the tractor wheel 11, it is to be understood that the device will protect the valve stem in the same manner when the wheel is turned so that the valve stem is located toward the inside. When in the latter position, the guard bars not only tend to push debris away from the valve stem but will also break up frozen mud and friable matter by crushing it against the tractor frame.

The added weight of the protector will not effect the operation of the tractor because of dynamic unbalance of the wheels, for tractors are normally operated at low speed and the tires are often partially filled with fluid which produces an unbalance in the wheels many times that produced by the weight of the valve stem protector.

Since the valve stem protector is mounted on the rim bolts of the tractor wheel, it can be easily applied to any wheel without modifying the rim or removing the tire.

While the protector completely surrounds and shields the valve stem from damage by objects lying in the line of rotation of the wheel, it leaves the end of the valve stem free so that a compressed air line can be readily connected to the valve stem in the usual manner, when the tire requires inflating.

It will now be clear that there has been provided a device that accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a wheel removably receiving a drop center rim having a tire mounted thereon and including a valve stem extending thru the rim, a valve stem protector comprising a base adapted to be secured to the aforesaid wheel proximate the rim at the valve stem, the said base having a vertical surface when so secured, a first laterally extending guard bar mounted on the said vertical base surface at a radially outward disposed angle, and a second laterally extending guard bar mounted on the said vertical base surface at a radially outwardly disposed angle, and in spaced relationship with the said first guard bar, the outer ends of the said guard bars converging to meet at a common point beyond the aforesaid valve stem to provide a protection therefor.

2. In combination, a wheel for a tractor or the like, a drop center rim having radially inwardly directed portions adapted to engage with the wheel, circumferentially-spaced bolt means engaging with the inwardly directed portions of the rim and securing the rim to the wheel, a pneumatic tire and tube mounted on the rim, a valve stem on the tube and extending through a hole in the side of the well of the rim so that the valve stem is spaced from and angles away from the plane of the wheel, a valve stem protector having portions lying substantially in the plane of the wheel and secured by said bolt means to the wheel, and a substantially V-shaped portion on the valve protector substantially hugging the inside of the rim and extending so that the apex of the V surrounds and protects the valve stem and the legs of the V extend into and are supported by the first-named portions of the valve protector substantially at the points where such portions are secured to the wheel by the bolt means.

3. In combination, a wheel for a tractor or the like, a drop center rim having radially inwardly directed portions adapted to engage with the wheel, circumferentially-spaced bolt means engaging with the inwardly directed portions of the rim and securing the rim to the wheel, a pneumatic tire and tube mounted on the rim, a valve stem on the tube and extending through a hole in the side of the well of the rim whereby said valve stem is spaced from and angles away from the plane of the wheel, a valve stem protector having portions lying substantially in the plane of the wheel and secured by said bolt means to the wheel, and a substantially V-shaped portion on the valve protector substantially hugging the inside of the rim, said valve stem extending into said protector adjacent and parallel to the apex of the V, the end of said stem terminating short of the bottom of the apex whereby the side and end of the stem are protected, the legs of V-shaped portion extending into and being supported by the first-named portions of said protector substantially at the points where such portions are secured to the wheel by bolt means.

GEORGE PAVKOV.

REFERENCES CITED

The following references are of record in the file of this patent:

UNITED STATES PATENTS

| Number | Name | Date |
| --- | --- | --- |
| 749,840 | Butler | Jan. 19, 1904 |
| 1,440,928 | Moore | Jan. 2, 1923 |
| 1,624,974 | Putnam | Apr. 19, 1927 |
| 2,162,732 | Lyon | June 20, 1939 |
| 2,243,380 | Kinney | May 27, 1941 |